United States Patent

Boyd et al.

[11] Patent Number: 5,017,749
[45] Date of Patent: May 21, 1991

[54] RESISTANCE WELDING APPARATUS

[75] Inventors: Andrew J. Boyd, Wantage; Andrea M. Webster, Epsom Downs, both of United Kingdom

[73] Assignee: CMB Packaging (UK) Limited, Worcester, United Kingdom

[21] Appl. No.: 131,823

[22] Filed: Dec. 11, 1987

[30] Foreign Application Priority Data

Dec. 17, 1986 [GB] United Kingdom ............... 8630157

[51] Int. Cl.⁵ ............................................. B23K 1/16
[52] U.S. Cl. ......................................... 219/64; 219/81
[58] Field of Search ............... 219/64, 61.5, 67, 81, 219/82, 109

[56] References Cited

U.S. PATENT DOCUMENTS 4,568,812  2/1982  Panknin et al. ...................... 219/64
4,700,037  10/1987  Weil ....................................... 219/64

FOREIGN PATENT DOCUMENTS 648781  9/1980  Switzerland .

Primary Examiner—Leo P. Picard
Assistant Examiner—Lincoln Donovan
Attorney, Agent, or Firm—Christie, Parker & Hale

[57] ABSTRACT

Apparatus for resistance welding an elongate seam in a tubular article, comprises a first electrode wheel outside the article, a second electrode inside the article and a continuous electrode wire arranged to pass over the electrodes to provide surfaces of contact between the electrodes and seam material. The second electrode has a stationary block having a guide surface of like curvature to that of the outer electrode wheel so that the contact arcs of wire passing over the guide surface with the seam material is substantially equal to the contact area of wire passing over the external wheel. The use of this stationary inner electrode improves the weld of geometry and permits welding of can bodies of relatively smaller diameter without use of mercury contact bearings.

12 Claims, 5 Drawing Sheets

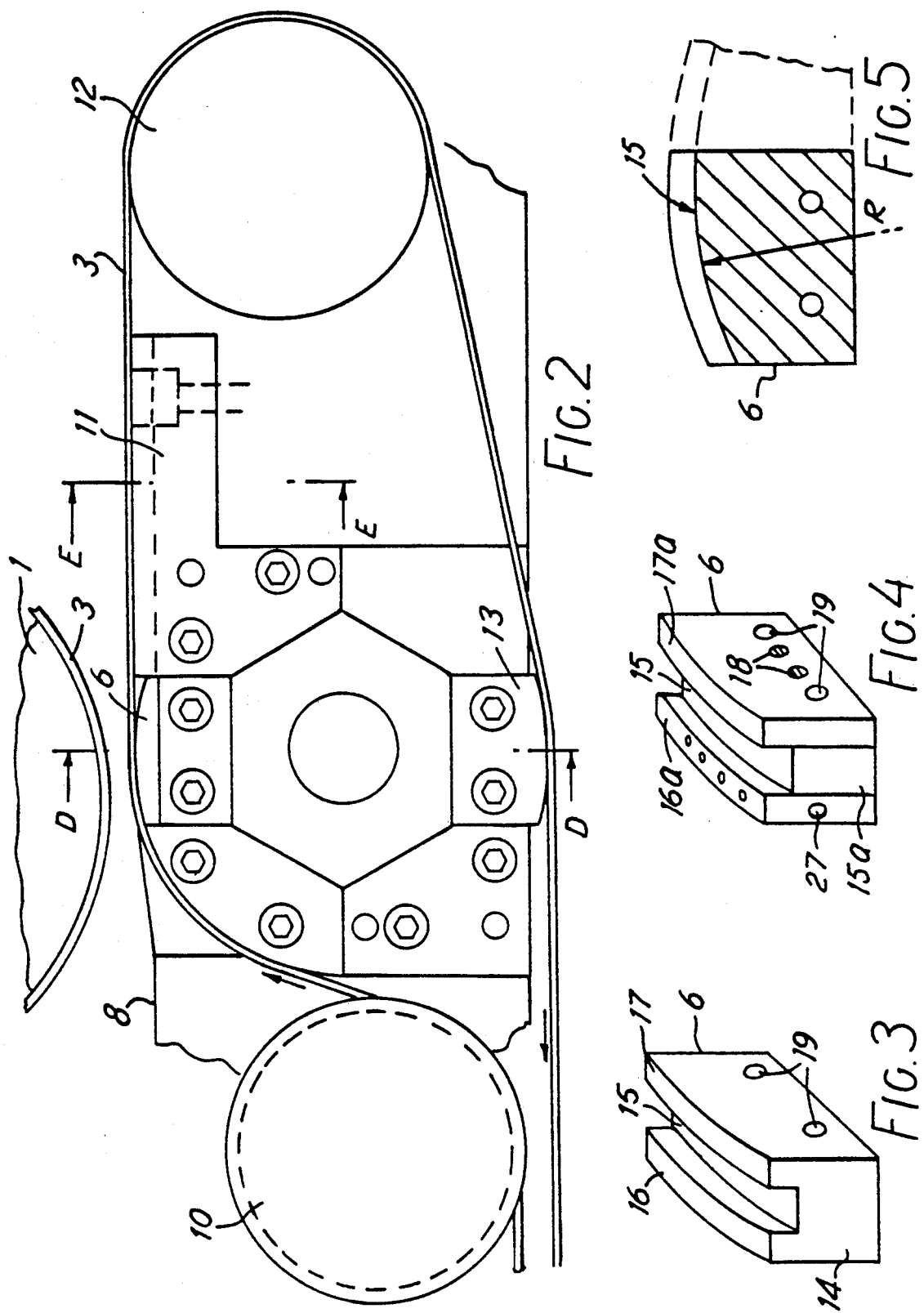

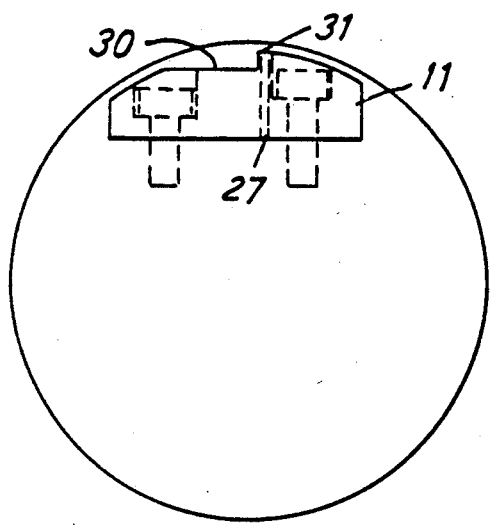
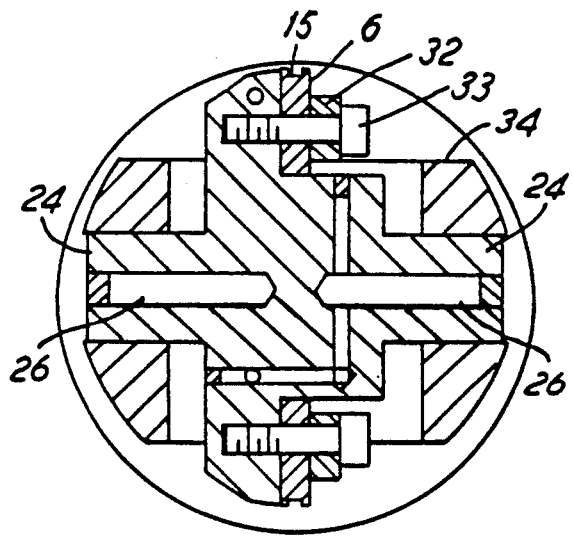
FIG.8  FIG.9
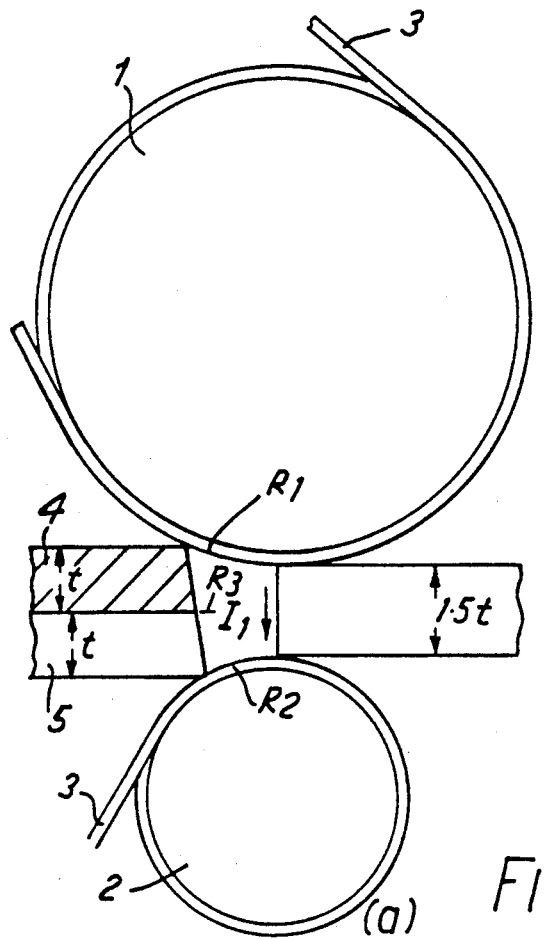
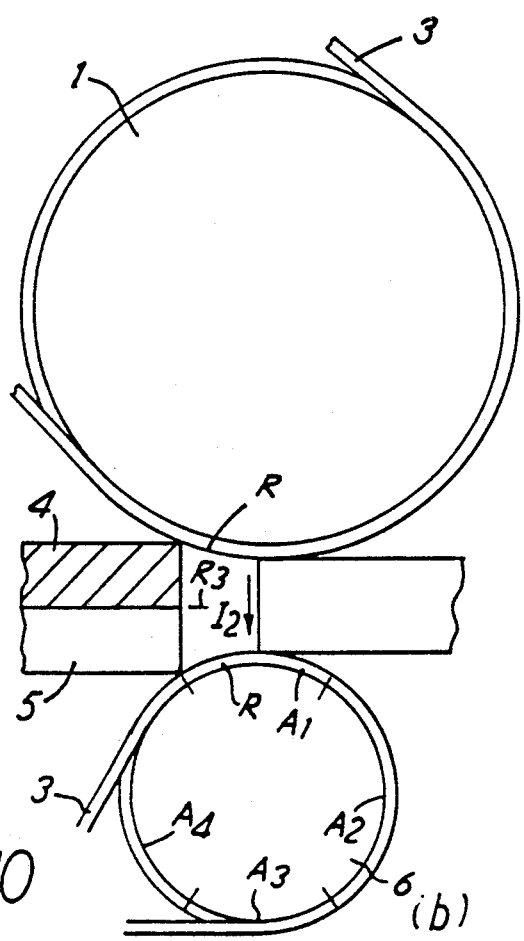
FIG.10

RESISTANCE WELDING APPARATUS

BACKGROUND OF THE INVENTION

1. Field of the Invention

This invention relates to resistance welding apparatus of a kind in which contact pressure, between a pair of metal surfaces joined, is imposed through the medium of an intermediate electrode wire guided by an electrode wheel on each side of the metal surfaces.

This kind of welding apparatus is particularly useful for welding steel sheet materials that have a metallic coating such as zinc, tin or chromium bearing layers (TFS) because the intermediate wire electrode is progressed around the electrode wheels to present a clean contact surface during welding and then take away any contaminating oxides or fused coating.

2. Description of the Invention

Particularly successful machines are sold by SOUDRONIC AG of Switzerland and described in British Pat. Nos. 910,216, 1,124,885 and 1,426,356 to which the reader is directed for further details. This kind of apparatus is widely used in the can making industry in which rectangular blanks of tinplate of TFS are roll formed to a cylinder having an overlapped side seam which is mash welded to make a can body.

European patent application No. 0041893 considers the problem arising when relatively small can bodies are being welded, namely the fact that the space inside the can body can only accommodate an electrode wheel that is smaller than the outside electrode wheel so that the difference in amplitude between the ridges and hollows along the weld, as created by each weld pulse, is accentuated on the interior surface of the weld. An internal electrode comprising support means to support an internal welding wheel which preferably rotates and a support roll is so arranged that the electrode wire passes across the welding wheel at which welding takes place, and continues its passage to the support roll while remaining in contact with the weld to improve the geometry of the weld and therefore its homogeneity.

French Patent published application No. 2553320 considers the distribution of energy arising in a lap welding process when the external electrode wheel is bigger than the internal welding wheel. The Applicants have surmised that the asymmetry of the contact surfaces may lead to problems with the quality of the spot welds, because energy released at the interface between the electrode with a smaller radius of curvature and the edge which it contacts is greater than the energy released at the interface between the second edge of the body and the electrode with a greater radius of curvature. As the material thickness t of each metal margin overlapped is reduced in the finished weld to a total wall thickness of about 1.5 t, this model is reasonable and leads to the conclusion that the maximum heating effect will be off-centre from the can metal to can metal contact at which it is needed. Accordingly, it is proposed in French Patent application No. 8316357 that the resistance of the coatings on the sheet metal to be welded should be selected to compensate for the difference between the internal and external contact areas.

The prior art apparatus uses costly mercury contacts to deliver electricity to the rotating electrode wheels. As one of the wheels is inside the can bodies being made there is a risk that any leakage of mercury will seriously contaminate a can interior.

SUMMARY OF THE INVENTION

The present invention sets out firstly to avoid use of a mercury contact; to permit reduction of the bulk of the internal electrode so that can bodies of smaller diameters such as say 45 or even 35 mm may be welded; and to balance the weld geometry.

Accordingly, the present invention provides apparatus for resistance welding an elongate seam in a tubular article, said apparatus comprising a first electrode wheel outside the article, a second electrode inside the article and an electrode wire arranged to pass over the electrodes to provide surfaces of contact between the electrodes and the seam material characterised in that the second electrode includes a stationary block having a guide surface of like curvature to that of the electrode wheel so that the contact area of a wire passing over the guide surface with the seam material is substantially equal to the contact area of wire passing over the external wheel with the exterior of the seam material. The benefits arising are that mercury bearings are not used inside the tubular article, and because the internal and external contact areas are substantially equalised a symmetrical distribution of welding energy is established about the metal to metal contact.

If desired, a preferably horizontal or gradually sloping portion may follow the curved guide surface of the solid block in a tangential direction so that the weld is smoothed.

In one embodiment of the apparatus the block is mounted in a holding means which also supports a freely rotating roller round which the electrode wire turns to return under the block for re-use or disposal.

The block or the supporting means or both, may be cooled by cooling means.

The stationary block may comprise a wear plate profiled to the desired curvature and to each side thereof a side plate to give lateral restraint to the wire as it passes along the profiled surface. The separable wear plate is cheap and convenient to replace when worn because it is accessible.

After use at the welding position on the block the wire may be returned under the block to pass through a guiding groove in the underside of the electrode for re-reeling or re-use.

BRIEF DESCRIPTION OF THE DRAWINGS

Various embodiments of the apparatus will now be described by way of example and with reference to the accompanying drawings in which:

FIG. 2 is a similar view of an internal electrode according to this invention;

FIG. 3 is a perspective view of a first embodiment of a guide block;

FIG. 4 is a perspective view of a second embodiment of a guide block;

FIG. 5 is a sectioned side view of the guide blocks of FIGS. 3 and 4;

FIG. 8 is a fragmentary section on line EE in FIG. 2;

FIG. 9 is a fragmentary section on line DD in FIG. 2; and

FIGS. 10a and 10b are diagrammatic views permitting comparison of the weld geometry of prior art and the present invention.

DESCRIPTION OF THE PREFERRED EMBODIMENTS

Figure 1:
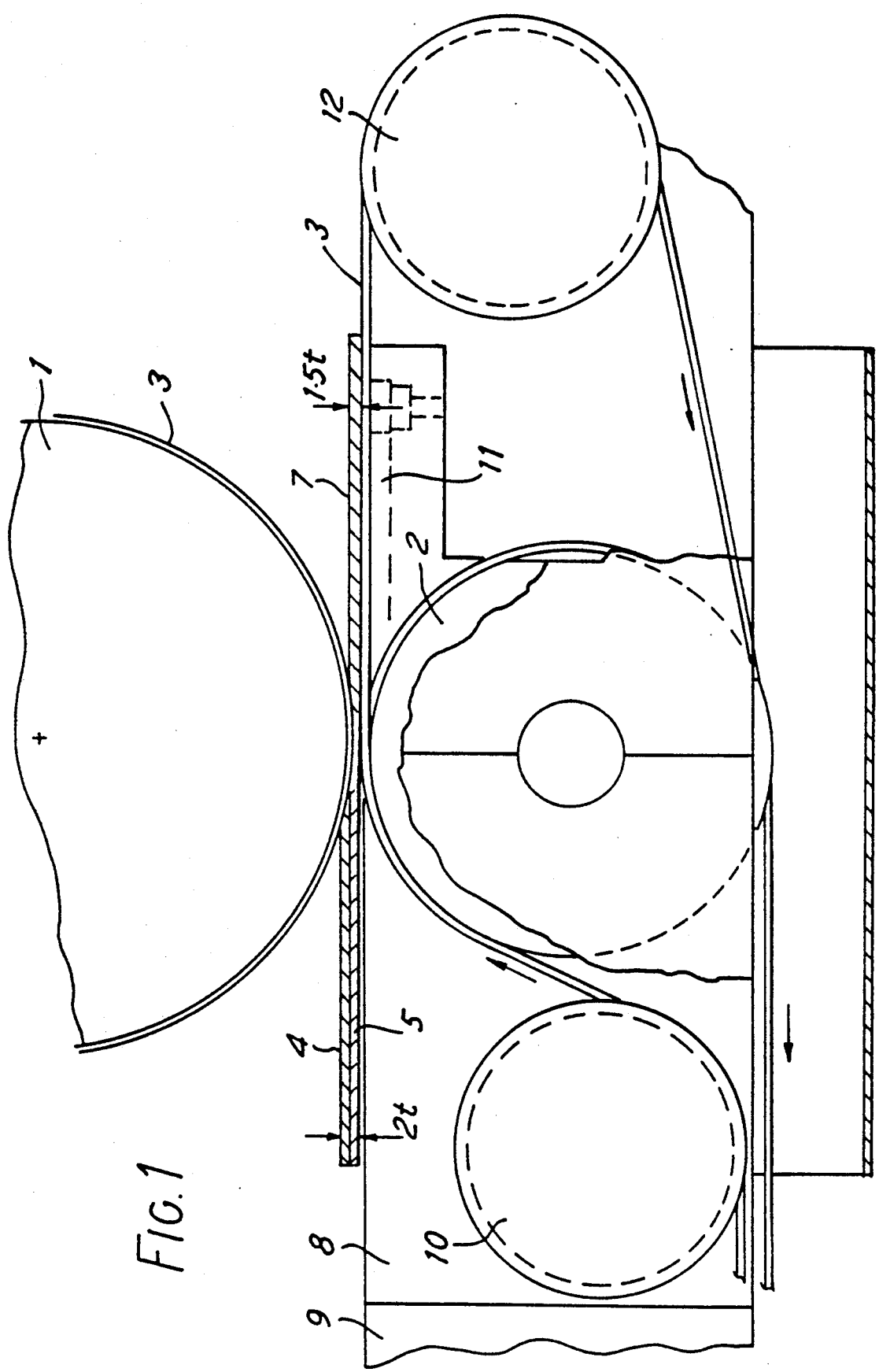
FIG. 1 is a cut-away side view of an internal electrode similar to that described in European Patent Publication No. 0041893A1.

FIG. 10a shows an upper welding wheel 1 which typically has a diameter of 85 mm, a lower welding roll 2 which typically has a diameter of 62 mm. A continous electrode wire 3 is wound round each roll so that the lap joint layers of metal 4, 5 are pinched between the wire on upper and lower rolls to create a mash weld. Before welding, each layer 4, 5 of metal has a thickness "t" commonly in the range 0.15 mm to 0.35 mm for ferrous based sheet metals such as tinplate or chrome/chrome oxide coated steels called TFS. After welding the finished weld thickness is typically about 1.5 t.

In FIG. 10a it will be seen that the portion of wire 3 on the upper or larger roll 1 makes a greater arc of contact than the portion of wire on the lower or smaller roll 2 so the current density at R1 between metal 4 and wire on upper roll 1 is less than the current density at R2 between the metal 5 and the wire on the lower roll 2. Furthermore the current path "I", as drawn is asymetric so the heat generated is not centred on the metal 4 to metal 5 contact R3 as is desirable.

One remedy would be to make both rolls 1 and 2 the same size but it is desirable to keep upper roll 1 large in diameter so that it is able to dissipate heat. This requirement limits the choice of the size of the lower roll. Current practice uses a lower roll of about 62 mm diameter so that the minimum internal diameter of can bodies that may be welded is just a bit bigger than 62 mm, say 65 mm, so that each body clears the underside of the lower or inner roll 2, as can be seen in FIG. 1 which will be discussed later.

In FIG. 10b the rotating lower roll 2 of FIG. 10a has been replaced by a stationary electrode 6 having an arcuate surface over which the electrode wire 3 slides to make contact during welding. The arcuate surface substantially replicates the curvature of the upper roll 1 so that the metal to wire contact resistances R are equalised. The curvatures of upper roll 1 and stationary electrode 6 being substantially equal, the contact areas are also equal so that the current path I2 is symmetrical so the heating effect is centred on the metal 4 to metal 5 contact R3 as is desirable.

FIG. 1 shows prior art apparatus during welding of the side seam of a can body 7. Components corresponding to like components in FIG. 10a are denoted by the same part numbers. A first electrode wheel 1 is supported in a frame (not shown) above the line of travel of the can body 7, from left to right as shown in FIG. 1. The external or first electrode wheel 1 cooperates with an internal or second electrode wheel 2 which is supported for rotation in an internal electrode frame 8 mounted on a mandrel 9 shown in part only. The frame 8 also supports a guide roll 10 from the underside of which wire 3 is fed to the topside of roll 2 and onwards across a support rail 11 to a turn roll 12 which returns the wire across the underside of roll 2 for re-reeling or re-use. As was apparent in FIG. 10a the outer electrode wheel 1 is larger in diameter than the inner roll 2. Both the inner electrode wheel 2 and outer electrode wheel 1 not only rotate to deliver electrode wire 3 to the roll pinch zone at which welding takes place but also delivers electrical power for resistance welding. The inner roll 2 is mounted on a stationary shaft and mercury contact bearings deliver current from the stationary shaft to the rotating wheel so it will be seen from FIG. 1 that any leakage of mercury from the inner bearing will contaminate the interior of the can body.

The apparatus shown in FIG. 2 is similar to that shown in FIG. 1 so like functioning components are denoted by the same part numbers, namely an external electrode wheel 1 moving an electrode wire 3 and an internal electrode comprising the frame 8 in which a guide roll 10 guides the wire 3 up over a support rail 11 to a turn wheel 12 which returns the wire.

However, the apparatus of FIG. 2 uses a stationary contact block 6 instead of a roll so that no mercury contact is required. A similar grooved block 13 is mounted on the underside of the frame 8 to guide returned wire from the turn roll 12 to the re-reeling position.

FIG. 3 shows a block 6 machined from a single piece of metal to have a body 14, a guide surface 15 and side flanges 16, 17 to restrain lateral movement as the wire 3 passes along the guide surface 15. FIG. 4 shows an alternative construction of the block 6 which comprises a guide plate portion 15a typically 1.9 mm wide and fixed between a pair of side plates 16a, 17a of similar thickness by means of countersunk screws. Whilst preassembly by means of the screws 18 may be convenient, the final fitting of cap screws through holes 19, to fix the block to the support 34, may be all that is necessary. The side plates 16a may, if desired, have passages formed in them to permit delivery of inert gas to shroud the weld.

FIG. 5 shows the profile of the guide surface 15 to have a curvature of radius R which is substantially equal to the radius of the outer electrode wheel 1. Therefore the contact areas of wire guided in block 6 and wire on the wheel 1 with the material to be welded are substantially equalised as discussed with reference to FIG. 10b.

It is necessary for any material chosen for manufacture of block 6 to (a) resist wear caused by the copper wire sliding over it; (b) have a low coefficient of friction, preferably about 0.1; and (c) to have a low contact resistance with respect to copper wire, preferably less than 250 micro ohms. One suitable material for the block 6 or the guide portion 15a is cemented tungsten carbide in a matrix of cobalt or preferably nickel which has a lower electrical resistance. However, other materials may be suitable.

Figure 6:
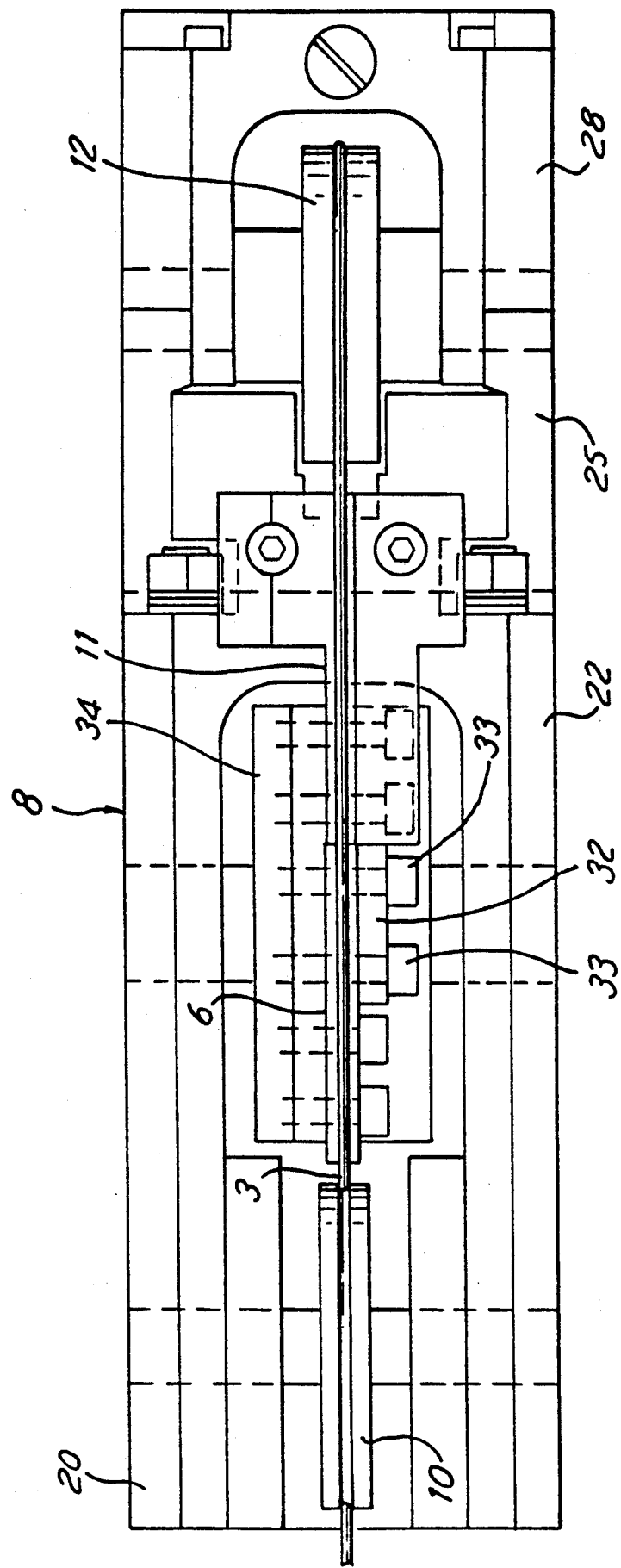
FIG. 6 is a plan view of the internal electrode of FIG. 2 but slightly modified by addition of an end cap.
Figure 7:
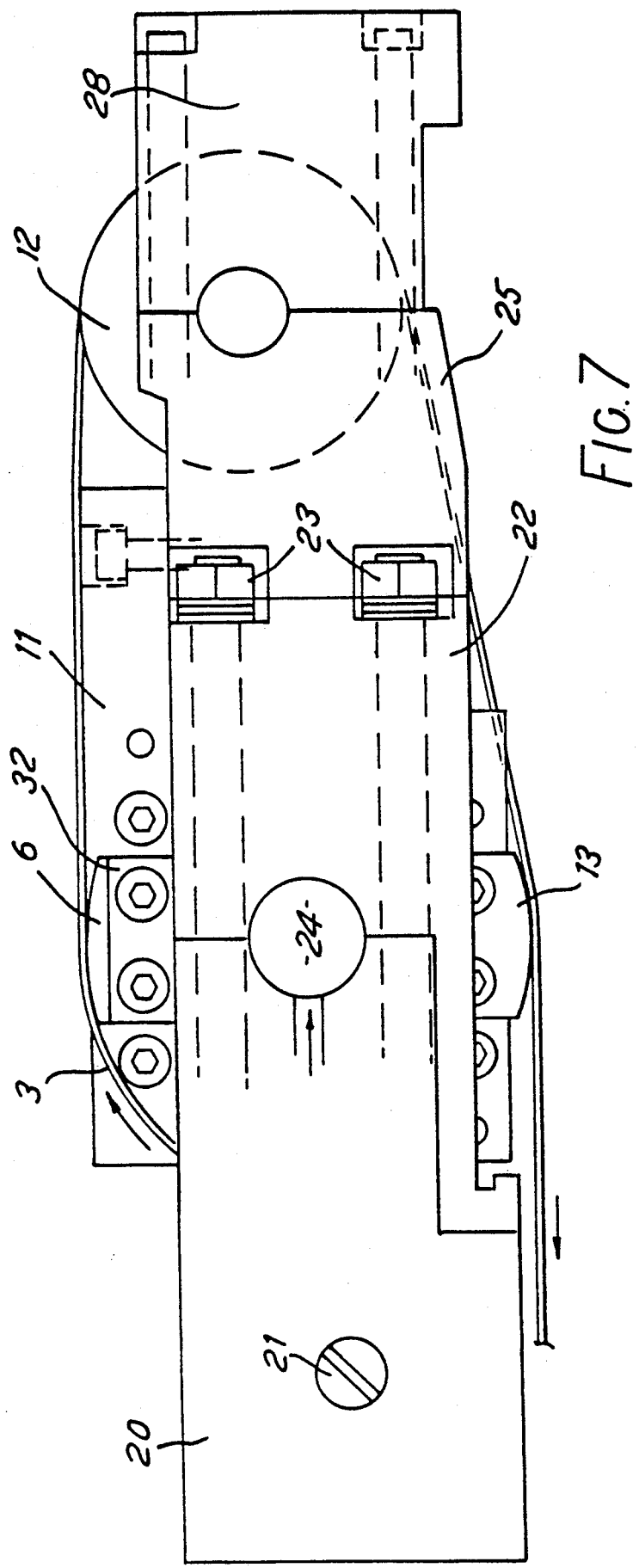
FIG. 7 is a side view of the internal electrode of FIG. 6.

The plan view FIG. 6 and side view FIG. 7 serve to show the internal electrode in sufficient detail to permit understanding of the relative positions of the guide roll 10, block 6 and turn roll 12.

It is desirable to incline the guide surface 15 and groove in external wheel 1 at opposed angles of about 0.5° to the line of travel of the can 7 so that the overlapped material of the can body is pulled into correct alignment to ensure that the weld is formed with a consistent overlap to make a true cylindrical body. This angle of inclination may be achieved on mounting or may be machined into the groove of the block 6 of FIG. 3 or alternatively machined into the side plate 16 of the composite block of FIG. 4.

In FIG. 7 it can be seen that the frame 8 comprises four parts. At the left hand end as shown in FIG. 7 a first part 20 houses a bearing 21 and is adapted for fixing to a welding arm portion not shown. A second frame part 22 is fixed by studs 23 to the first part 20 at approximately the centre of a support 34 which supports the block 6. This location joint is chosen to facilitate assembly of the support 34 to the frame 8 and connection of water cooling and inert gas supply lines (not shown). The support 34 has round stems 24 which fit in the frame part 20, 22 in like manner to the prior art roll and axle which it replaces. In order to prevent rotation of the support 34 a side block 32 is fixed to the support 34 by means of cap screws 33 which also fix the block 6 to the support 34. The side block 32 may abut the frame members or, as shown in FIGS. 6 and 7, abut the support rail 11 to prevent rotation.

In FIG. 9 the lateral relationship of the side block 32 to the block 6 is clearly shown. Also shown in FIG. 9 are passages 26 for water or other coolant. Passages 27 for nitrogen or other inert gas used to shroud the weld to minimise oxidation may be provided in block 6 as is best seen in FIG. 4 but may, if desired, extend into the rail 11 as shown in FIG. 8.

A third frame part 25 connects the second part to a fourth part or end cap 28, the joint between the third and fourth parts being centred on the bearing of the turn roll 12. The third frame part 25 also provides fixing points for fixing the support rail 11.

In FIG. 8 the support rail 11 can be seen to comprise a substantially flat surface 30 alongside which there extends a flange 31 which delivers shrouding gas through passages 27.

Referring again to FIG. 10b it will be noticed that the "inside" stationary electrode 6 has a periphery made up of four distinct arcs of differing curvature A1 A2 A3 A4. Arc A1 is that of the support surface 15a in FIGS. 3/4 and of a radius approximate by half the diameter of upper roll 1 (e.g. 42.5 mm radius). Arcs A2 and A3 are so arranged that the wire is always at a tangent to each arc. In FIG. 10b this static electrode is symmetrical so arcs A1 and A3 are identical and arcs A2 and A4 are also identical.

Clearly the static inner electrode, devoid of wheels as shown in FIG. 10b is commercially attractive because it has no moving parts and so should be cheaper to make than the moving rolls of other embodiments. However, arcs A1, A2 and part of A3 and A4 all create a frictional drag on the progress of the wire. In order to minimise frictional effects one or several rolls may be introduced if desired, for example at the start of each arc or alternatively a single fairly large turn roll close spaced to block 6 of arc A1.

Arc A1 may, if desired, include a curved portion followed by a substantially horizontal or slightly sloping ramp to maintain wire contact after welding as shown by dashed lines in FIG. 5. Ideally any support rail surface provided should extend in a direction tangential to the curvature of the block 6.

While the presently preferred embodiment of the present invention has been illustrated and described, modifications and variations thereof will be apparent to those skilled in the art given the teachings herein, and it is intended that all such modifications and variations be encompassed within the scope of the appended claims.

We claim:

1. Apparatus for resistance welding an elongate seam in a tubular article, said apparatus comprising:
   an electrode wheel defining an external surface of predetermined curvature;
   means for mounting the electrode wheel outside the article;
   a stationary electrode comprising a stationary block, the stationary block having
   a wear plate defining a guide surface having a curvature substantially equal to the predetermined curvature of the electrode wheel,
   side plates flanking the wear plate to laterally limit the guide surface, at least one side plate defining a passage for supplying an inert gas to shroud the guide surface during welding and thereby inhibit oxidation, and
   means securing said side plates to the wear plate;
   holding means for mounting the stationary electrode inside the article;
   an electrode wire; and
   means for guiding the electrode wire to pass over the electrode wheel and the stationary electrode to provide surfaces of contact between the electrode wheel and the stationary electrode and the seam material so that the contact area of a wire passing over the guide surface with the seam material is substantially equal to the contact area of wire passing over the electrode wheel with the exterior of the seam material.

2. Apparatus according to claim 1 wherein the holding means includes a freely rotating roller round which the wire is turned to travel back under the block.

3. Apparatus according to claim 1 including cooling means in the block or in the holding means for cooling said block.

4. Apparatus according to claim 1 wherein the stationary electrode defines a groove in the underside thereof so that after welding the wire is returned through said groove.

5. Apparatus according to claim 1 wherein the second electrode includes a horizontal or slightly sloping portion which extends from the guide surface of the block in a direction substantially tangential to the curvature of the guide surface.

6. Apparatus according to claim 2 including cooling means in the block or in the holding means for cooling said block.

7. Apparatus according to claim 2 wherein the stationary electrode defines a groove in the underside thereof so that after welding the wire is returned through said groove.

8. Apparatus according to claim 2 wherein the stationary electrode includes a horizontal or slightly sloping portion which extends from the guide surface of the block in a direction substantially tangential to the curvature of the guide surface.

9. Apparatus according to claim 3 wherein the stationary electrode defines a groove in the underside thereof so that after welding the wire is returned through said groove.

10. Apparatus according to claim 3 wherein the stationary electrode includes a horizontal or slightly sloping portion which extends from the guide surface of the block in a direction substantially tangential to the curvature of the guide surface.

11. Apparatus according to claim 4 wherein the stationary electrode includes a horizontal or slightly sloping portion which extends from the guide surface of the block in a direction substantially tangential to the curvature of the block.

12. Apparatus for resistance welding an elongate seam in tubular article, said apparatus comprising
   an electrode wheel defining an external surface of predetermined curvature,
   means for mounting the electrode wheel outside the article, an electrode wire,
a stationary electrode block, said stationary electrode block comprising,
   a wear resistant guide plate defining a guide surface having a curvature substantially equal to that of the electrode wheel, said guide plate defining passages for coolant,
   a pair of sideplates flanking said guide plate to latterally limit the displacement of said wire when on said guide surface, at least one of said side plates defining passages for supplying an inert gas to the elongate seam to shroud the seam during welding so as to inhibit oxydation,
means for mounting the second electrode inside the article, and
means for guiding the electrode wire to pass over the electrodes to provide surfaces of contact between electrodes and the seam material so that the contact area of a wire passing over the guide surface with the seam material is substantially equal to the contact area of wire passing over the external wheel with the exterior of the seam material.

* * * * *

UNITED STATES PATENT AND TRADEMARK OFFICE
CERTIFICATE OF CORRECTION

PATENT NO.   : 5,017,749
DATED        : May 21, 1991
INVENTOR(S)  : Andrew J. Boyd; Andrea M. Webster It is certified that error appears in the above-identified patent and that said Letters Patent is hereby corrected as shown below:

On the title Page:

[56] References Cited, U.S. PATENT DOCUMENTS, after "4,568,812" change "2/1982" to -- 2/1986 --.

Abstract, line 12, after "weld" delete "of".

Column 1, line 25, after "tinplate" change "of" to -- or --.
Column 3, line 9, change "continous" to -- continuous --.
Column 3, lines 24,25, change "asymetric" to -- asymmetric --.
Column 4, line 64, change "left hand" to -- left-hand --.
Column 5, line 45, after "example" insert a comma.

In the Claims:

Column 7, line 9, change "sideplates" to -- side plates --.
Column 7, line 10, change "latterally" to -- laterally --.

Signed and Sealed this

Twelfth Day of January, 1993

Attest:

DOUGLAS B. COMER

Attesting Officer    Acting Commissioner of Patents and Trademarks